Feb. 17, 1925.　　　　　　　　　　　　　　　　　1,526,896
W. E. BENTON
AMUSEMENT DEVICE
Filed March 3, 1924

Inventor
William E. Benton
By Davey, Strong, Townsend & Loftus
Attorneys

Patented Feb. 17, 1925.

1,526,896

UNITED STATES PATENT OFFICE.

WILLIAM E. BENTON, OF SAN FRANCISCO, CALIFORNIA.

AMUSEMENT DEVICE.

Application filed March 3, 1924. Serial No. 696,567.

*To all whom it may concern:*

Be it known that I, WILLIAM E. BENTON, a citizen of the United States, residing at the city and county of San Francisco and State of California, have invented new and useful Improvements in Amusement Devices, of which the following is a specification.

This invention relates to an amusement device and particularly pertains to a composite chart.

It is the principal object of the present invention to provide a composite chart, the component parts of which may be separately moved relative to each other to form various designs, as for example, in the present case the face of a person in which instance the chart may be used as a phrenology chart, and may carry suitable reading matter associated with the various component elements of the designs, so that a human face may be formed having various characteristic elements of physiognomy.

The present invention contemplates the use of a face plate upon which is mounted a plurality of separately movable members, each member carrying a plurality of elements of design which may be brought one at a time to register with elements of design on the various other disks whereby a composite design will be formed.

The invention is illustrated by way of example in the accompanying drawings, in which.

Referring more particularly to the drawings, 10 indicates a body plate preferably formed of thin gaged sheet metal and being substantially circular in shape. The central portion of this plate is cut away to form an opening bounded by a plurality of scallops or fingers 11, each of which carries a tang 12. In the present instance ten of these fingers are shown, although it will be understood that any number might be provided as desired. The tangs 12 are intended to form pivots for circular disks 13 which are intended to be rotatably mounted upon the various tangs.

Figure 1:
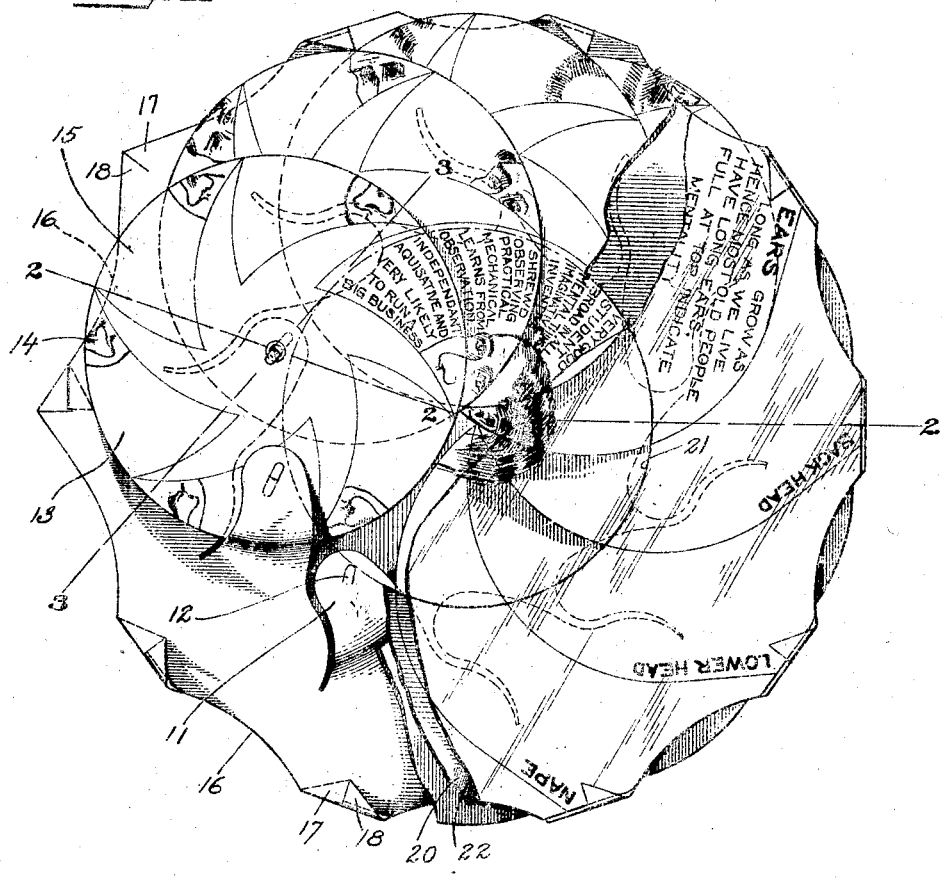
Fig. 1 is a view in elevation showing the complete invention with parts broken away to more clearly disclose its construction.
Figure 2:
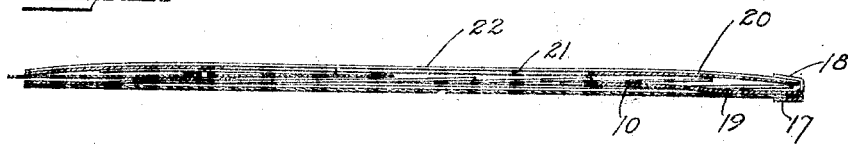
Fig. 2 is a view in transverse section through the device disclosed in Fig. 1 as seen on line 2—2 of Fig. 1, and more particularly disclosing the various elements of invention as assembled.
Figure 3:
Fig. 3 is a fragmentary view in transverse section on the line 3—3 of Fig. 1 showing the manner in which the disks are mounted.

As clearly shown in Fig. 1 of the drawings, the disks are of a diameter to permit them to be pivotally mounted on the tang of one finger and to pass under the next succeeding finger on one side so that a disk may be disposed in overlapping relation on the tang of said finger, thus making it possible to mount a plurality of disks, as for example ten in the present case, in overlapping relation to each other, whereby their circumferential edges will intersect at the center of the body plate 10 in a rosette fashion, and will make it possible for the several disks to disclose component parts of a design adjacent their points of intersection, whereby a composite design may be produced. The various disks carry diagrams of parts of the human physiognomy, one disk carrying diagrams of different characteristic eyes, and others carrying diagrams of forehead, ears, back head, lower head, nape, jaw, chin, lips, and nose.

Accompanying the component parts of physiognomy on the various disks may be appropriate reading matter relating to the characteristics of those parts as assigned to them by phrenologists, as shown by example in the printed matter on Fig. 1 of the drawings. Referring to this figure, it will be seen that the disks carry component parts of designs as indicated at 14 and that fields 15 are formed on the disk adjacent the designs for the reception of appropriate descriptive matter. The body plate 10 is formed with a plurality of scallops 16 around its circumferential edge to allow the disks 13 to project beyond the body plate and to permit a portion of each disk to be thus presented for rotation of the disk. Between the scallop portions tangs 17 and 18 are formed. One of these tangs of each part is bent rearwardly to secure a back plate 19 in position to cover the entire back face of the body plate 10. This back plate may be of cardboard and may carry appropriate reading matter. The opposite tang 18 may be bent forwardly and over upon the body plate to secure a front plate 20 in position. This plate conceals the major portion of all of the disks 13 as well as their pivotal mounting, and is formed with a central opening 21, through which the interesecting portions of the disks may be observed. The front plate 20 may carry suitable indicia, as for example, matter relating to the different component parts of faces, such as the statements concerning ears as appears on Fig. 1 of the drawings. The front plate 20 is covered by a transparent sheet of material 22. This is preferably celluloid.

In operation of the present invention, the device is assembled, as here shown and previously described, after which it may be used by separately rotating the disks 13 to bring a desired component part of a face near the center of the opening 21 and to match the various component parts on the several disks to form a particular type of face and head. After this has been done, the reading matter appearing upon the portions of the disks disclosed through the central opening 21 may then be read and will give the characteristics indicated according to the art of phrenology.

It will be understood that the present device is subject to other adaptations, as for example the different disks may be fitted with different segments of conventional design which may be brought together to produce some familiar design by the combination of component parts on the various disks, thus affording instruction and amusement.

While I have shown the preferred form of the invention as now known to me it is to be understood that various changes may be made in its construction without departing from the spirit of the invention as defined in the appended claims.

Having thus described my invention, what I claim and desire to secure by Letters Patent is:

1. An amusement device comprising a body member, a plurality of disks rotatably supported upon the body member in substantially the same plane, the circumferences of said disks intersecting each other at substantially the center of the body member, each of the disks carrying component parts of designs which may separately be caused to form a composite design around the intersecting center of the disks.

2. An amusement device comprising a body member, a plurality of disks rotatably mounted on said body member in substantially the same plane and in overlapping relation to each other, whereby the outer circumferences of said disks will all intersect at the center of the body member, each of the disks carrying component parts of various designs on their upper faces, which parts may be separately brought together around the point of intersection of the disks in a manner to form a composite design.

3. An amusement device comprising a body member, a plurality of pivots thereon arranged in equal spaced relation to each other along a circle, a plurality of disks, one of which is mounted on each of said pivots, said disks being disposed in overlapping relation to each other and in substantially the same plane and of a diameter substantially equal to the diameter of the circle along which the disks pivots are arranged, a cover member formed with a central opening concentric with the circle along which the pivots are arranged and of a diameter less than the diameter of said circle, each of said disks carrying on its upper face a plurality of design segments which may be successively disclosed through the opening in the top plate as said disks are rotated, whereby the design segments of the various disks appearing in the central opening of the cover member will form a composite design.

4. A phrenology chart comprising a body member, a plurality of disks thereon capable of independent rotation on said body member, separate disks carrying diagrams and data relating to the different parts of the human physiognomy, whereby rotation of the various disks will permit the diagram portions thereon to come into such relation to each other as to form the diagram of a human head having selected physiognomy characteristics.

5. A phrenology chart comprising a body member, a plurality of pivots carried by said body member and disposed in equal spaced relation to each other and the center of the body member, and a plurality of disks, one disposed on each of said pivots and capable of independent rotation, the circumferences of all of said disks intersecting each other at substantially the center of the body member, each of the disks carrying diagrams representing different parts of the human physiognomy whereby individual diagrams on each of the disks may be selectively brought to register at the point of intersection of the disks to form a composite diagram of a human head.

6. A phrenology chart comprising a body member, a plurality of pivots carried by said body member and disposed in equal spaced relation to each other and the center of the body member, and a plurality of disks, one disposed on each of said pivots and capable of independent rotation, the circumferences of all of said disks intersecting each other at substantially the center of the body member, each of the disks carrying diagrams representing different parts of the human physiognomy whereby individual diagrams on each of the disks may be selectively brought to register at the point of intersection of the disks to form a composite diagram of a human head, and each of the disks carrying phrenology data associated with the segmental diagrams thereof, whereby a phrenology chart will be formed around the composite diagram of a head formed at the intersection of the disks.

7. A phrenology chart comprising a body member carrying a plurality of pivots disposed equidistant to each other and to a common center, separate rotatable disks, one of which is mounted on each of said pivots, the various disks each carrying a plurality of diagrams disclosing separate parts of the human physiognomy, and which diagrams are so positioned on the disks as to permit individual diagrams of all the disks to be collectively assembled around the point of intersection of the disks to form a composite diagram of human head and face, and the member covering the disks and formed by the center opening disclosing the portions of diagrams on the disks which have been assembled to form the head.

8. A phrenology chart comprising a body member carrying a plurality of pivots disposed equidistant to each other and to a common center, separate rotatable disks, one of which is mounted on each of said pivots, the various disks each carrying a plurality of diagrams disclosing separate parts of the human physiognomy, and which diagrams are so positioned on the disks as to permit individual diagrams of all the disks to be collectively assembled around the point of intersection of the disks to form a composite diagram of human head and face, and the member covering the disks and formed by the center opening disclosing the portions of the diagrams on the disks which have been assembled to form the head, the various diagrams on the disks being associated with indicia relating thereto, and which indicia will be grouped around the head thus formed, and will be disclosed through the opening in the cover.

9. A phrenology chart comprising a back plate formed with a plurality of symmetrically arranged flanges disposed in equidistance to each other and to a common center, a pivot carried on each of the flanges, disks, one of which is mounted on each of the pivots, and each of which disks extend over the flange on one side of the flange upon which it is mounted and beneath the flange on the opposite side of the flange upon which it is mounted, whereby the disks carried by the several pivots will be disposed in overlapping pivotal relation to each other, and with the circumferences of the disks intersecting each other at a center common to all of the pivots, each disk carrying a plurality of diagrams representing variations in facial characteristics of a certain area of a human face, whereby a selected diagram of each disk when combined with selected diagrams of the remaining disks will form a composite diagram of a face and head around the point of intersection of the circumferences of the disk, data on the disks specifically relating to the diagrams with which they are associated, and the cover plate for concealing the major portions of the disks and their pivots, but disclosing a single segment of each of the disks as they lie in overlapping relation to each other to permit the composite head diagram to be observed, and the associated data arranged therearound to be read.

10. A phrenology chart comprising a back plate formed with a plurality of symmetrically arranged flanges disposed in equidistance to each other and to a common center, a pivot carried on each of the flanges, disks, one of which is mounted on each of the pivots, and each of which disks extend over the flange on one side of the flange upon which it is mounted and beneath the flange on the opposite side of the flange upon which it is mounted, whereby the disks carried by the several pivots will be disposed in overlapping pivotal relation to each other, and with the circumferences of the disks intersecting each other at a center common to all of the pivots, each disk carrying a plurality of diagrams representing variations in facial characteristics of a certain area of a human face, whereby a selected diagram of each disk when combined with selected diagrams of the remaining disks will form a composite diagram of a face and head around the point of intersection of the circumferences of the disk, data on the disks specifically relating to the diagrams with which they are associated, the cover plate for concealing the major portions of the disks and their pivots, but disclosing a single segment of each of the disks as they lie in overlapping relation to each other to permit the composite diagram head to be observed, and the associated data arranged therearound to be read, and tangs formed on the back plate to be bent over the cover plate in a manner to hold said plate in position.

WILLIAM E. BENTON.